3,309,228
GRID FOR POSITIVE PLATES FOR LEAD
ACID BATTERIES
Vance H. Dodson, Needham, Mass., and Joseph L. Rooney, Sylvania, Ohio, assignors to Ford Motor Company, Dearborn, Mich., a corporation of Delaware
No Drawing. Filed Apr. 2, 1963, Ser. No. 269,856
4 Claims. (Cl. 136—56)

This application is a continuation-in-part of copending application S.N. 89,366, filed Feb. 15, 1961, now abandoned, which in turn is a continuation-in-part of S.N. 12,920, filed Mar. 7, 1960, and now abandoned.

This invention relates to dry-charged lead-acid storage batteries and more particularly to positive plate grids of such batteries.

The invention provides positive grids having improved characteristics which provide quick, effective battery performance when the dry-charged battery is activated in certain temperature ranges by the addition of the electrolyte.

A positive battery plate, as is well known in the art, comprises a lead alloy grid member which supports a lead dioxide active material. It is also well known that lead dioxide reacts with metallic lead to form lead oxide. This reaction takes place on the positive plates of dry-charged lead-acid storage batteries between the grid metal and the active material during the period of time between manufacturing and final activation by the addition of the electrolyte, preparatory to placing the battery in service. The particular reaction referred to is considered to result in a film of lead oxide that forms at the interface of the two materials, the film having high electrical resistance characteristics which insulates the active material from the grid member. This results in a reduction of both the voltage and the capacity of the positive plates, and, therefore, of the battery as a whole as long as it exists before being destroyed by normal reactions within the battery. The effect of the lead oxide film on the capacity of the battery is especially noticeable when the battery is activated under cold conditions, such as when a cold battery is filled with cold electrolyte, and then placed in service.

It is, therefore, a principal object of this invention to provide an improved positive grid which will eliminate the undesirable characteristics of present positive grids wherein lead is the major constituent by weight by reducing the rate of reaction between the grid alloy and the lead dioxide active material to an extremely low rate, so that dry-charged positive plates constructed of such an improved grid will exhibit satisfactory voltage and capacity characteristics when such a dry-charged battery is filled and placed in service at the normally anticipated temperature range of from about 30° F. to 80° F.

Another object of this invention is to provide a lead comprising positive grid at least partially coated with a layer of cadmium.

Other objects and advantages of this invention relating to the arrangement, operation and function of the related elements of the structure, to various details of construction, to combination of parts and to economics of manufacture will be apparent to those skilled in the art upon consideration of the following description and appended claims.

A dry-charged battery is one that has been assembled at the factory in the dry state, sealed and shipped to the consumer outlets. The battery is stored at the outlets in the dry-charged state until it is sold to the consumer, so that the time interval between manufacturing and selling may be many months. Upon the battery's being sold to a customer, the general practice has been to fill the battery with electrolyte having the correct specific gravity, whereupon it is immediately installed in an automobile (or other vehicle) with the expectation that the voltage and capacity of the newly filled battery will be enough to crank the engine of the vehicle at a speed sufficient to start it. After low temperature activation, this procedure often gave unsatisfactory results and the present invention alleviates the most important condition in the dry-charged battery which causes these failures in service.

The present invention is based upon the discovery that a thin layer of cadmium on surfaces of the positive grid will effectively prevent solid state reaction of the lead comprising positive grid with the lead oxide ($PbO_2$) active material of the positive plate for extended periods of dry-charge storage. While preventing this reaction in the dry-charged state the coating must be a material that will not interfere with the normal function of the grid and the battery as a unit when the latter is cycled with a sulfuric acid electrolyte. Cadmium meets both such requirements. The cadmium layer need not be continuous over the entire surface of the grid. A significant portion of the surface of the grid is advisedly covered with cadmium so as to maintain a significant portion of the surface free of PbO until the battery is charged with electrolyte. The depth of cadmium coat may be as small as the technique of application will permit and still provide effective separation of the lead comprising grid. This is somewhat different from other uses of plating for protective or decorative reasons where a pin hole free coating is essential. Economics will ordinarily dictate maintaining the thickness of the cadmium coat below about 0.001 inch although a thicker coating could be used. The cadmium may be effectively applied to the lead comprising positive grid by conventional coating methods, e.g. electroplating, vacuum deposition, flash plating, etc.

The invention will be more fully understood from the following examples which are illustrative only and should not be considered as limitations upon the true scope of the invention as set forth in the appended claims.

Example 1

Metal sandwiches are assembled from $PbO_2$ and essentially pure lead, tin, zinc, cadmium, bismuth, aluminum, copper, and silver. The first five of the above mentioned metals are annealed at 300° to 350° F. prior to assembly. The sandwiches are placed in an oven at 200° F. for a period of 300 hours. The electrical resistance of each sandwich is measured at various time intervals during the storage period. A comparison of the resistances of the various metal-$PbO_2$ sandwiches is shown in the following table:

TABLE I.—CHANGES IN ELECTRICAL RESISTANCE WITH TIME IN COUPLING OF LEAD DIOXIDE WITH METALS INDICATED

| Pure Metal | Resistance, ohms, after storage at 200° F. | | |
|---|---|---|---|
| | 100 Hrs. | 200 Hrs. | 300 Hrs. |
| Aluminum | 55 | 70 | 80 |
| Zinc | 36 | 45 | 48 |
| Lead | 32 | 42 | 48 |
| Bismuth | 27 | 28 | 29 |
| Copper | 0.32 | 0.34 | 0.35 |
| Tin | 0.04 | 0.04 | 0.04 |
| Cadmium | 0.006 | 0.006 | 0.006 |

Example 2

A conventional lead-acid type storage battery is assembled in which the positive grids are formed in the usual manner from a conventional lead-antimony-tin type alloy with the single difference from conventional procedure being that the grids are plated prior to assembly with a thin coating of cadmium, i.e. below about 0.1 mil.

The battery is stored in dry-charged condition for about six months and then activated by the introduction of a conventional sulfuric acid electrolyte at a temperature of about 30° F. The battery is immediately installed in an automobile and used to start the motor thereof thereby demonstrating the requisite quick response with both voltage and capacity.

In further tests particularly satisfactory results are obtained by using cadmium coated positive grids formed from alloys in which the following listed constituents are employed within the ranges indicated:

| | Percent |
|---|---|
| Antimony | 3–7. |
| Arsenic | 0.0–0.6. |
| Cadmium | 0.0–0.1. |
| Tin | 0.1–0.5. |
| Copper | 0.05–0.1. |
| Silver | .005 max. |
| Iron | .005 max. |
| Nickel | .010 max. |
| Cobalt | .005 max. |
| Zinc | .006 max. |
| Bismuth | .050 max. |
| Manganese | .005 max. |
| Lead | Remainder. |

Further tests are conducted with a specific alloy coated with a 0.2 mil layer of cadmium and excellent results are obtained. This alloy has the following composition exclusive of the coating:

| | Percent |
|---|---|
| Antimony | 5.75–6.25. |
| Tin | .30–.50. |
| Copper | .080 max. |
| Silver | .005 max. |
| Iron | .005 max. |
| Nickel | .010 max. |
| Cobalt | .005 max. |
| Zinc | .006 max. |
| Bismuth | .050 max. |
| Manganese | .005 max. |
| Lead | Remainder. |

It will be understood that the invention is not to be limited to the exact composition of the lead comprising grid upon which the cadmium layer is superimposed and that various changes and modifications can be made in the composition of such grid and within the methods employed for coating the same with cadmium without departing from the spirit and scope of the invention as defined in the appended claims.

We claim:

1. In a lead-acid type storage battery having in its operational combination a positive grid comprising elemental lead and active material comprising lead dioxide within and supported by said grid, the improvement which comprises a layer of cadmium between said grid and said dioxide and covering a significant portion of the surfaces of said grid which except for intervention of said layer would be in contact with said lead dioxide, said layer being of sufficient depth and extent in grid coverage to prevent significant solid state reaction of said grid with said lead dioxide before said battery is charged with electrolyte and insufficient to significantly interfere with the normal function of said grid, said active material and said battery, when said battery is charged with a sulfuric acid electrolyte.

2. In a lead-acid type storage battery having in its operational combination a positive grid fabricated from a lead-antimony alloy in which elemental lead is the major component and an active material the major component of which is lead dioxide within and supported by said grid, the improvement which comprises a layer of cadmium of less than 0.001 inch thickness between said grid and said dioxide and covering a portion of the surfaces of said grid which except for intervention of said layer would be in contact with said lead dioxide, said layer being of sufficient extent to maintain a significant portion of said surfaces free of PbO until the battery is charged with electrolyte and insufficient to significantly interfere with the normal function of said grid, said active material and said battery when said battery is charged with a sulfuric acid electrolyte.

3. In a lead-acid type storage battery having in its operational combination a positive grid fabricated from a lead-antimony alloy consisting essentially of about 3 to 7% antimony, 0.1 to 0.5% tin, 0.05 to 0.1% copper and a remainder consisting essentially of lead, and an active material the major component of which is lead dioxide within and supported by said grid, the improvement which comprises a discontinuous layer of cadmium of less than 0.0001 inch thickness between said grid and said dioxide and covering a portion of the surfaces of said grid which except for intervention of said layer would be in contact with said lead dioxide, said layer being of sufficient extent to maintain a significant portion of said surfaces free of PbO until the battery is charged with electrolyte and insufficient to significantly interfere with the normal function of said grid, said active material and said battery when said battery is charged with a sulfuric acid electrolyte.

4. In a lead-acid type storage battery having in its operational combination a positive grid fabricated from a lead-antimony alloy consisting essentially of about 3 to 7% antimony, 0.2 to 0.6% arsenic, 0.05 to 0.10% cadmium, 0.1 to 0.5% tin, 0.05 to 0.1% copper and a remainder consisting essentially of lead, and an active material the major component of which is lead dioxide within and supported by said grid, the improvement which comprises a discontinuous layer of cadmium less than 0.001 inch thickness between said grid and said dioxide and covering a portion of the surfaces of said grid which except for intervention of said layer would be in contact with said lead dioxide, said layer being of sufficient extent to maintain a significant portion of said surfaces free of PbO until the battery is charged with electrolyte and insufficient to significantly interfere with the normal function of said grid, said active material and said battery when said battery is charged with a sulfuric acid electrolyte.

References Cited by the Examiner

UNITED STATES PATENTS

| 1,504,298 | 8/1924 | Wissler et al. | 204—50.1 |
| 2,317,759 | 4/1943 | Haebler | 136—64 |

FOREIGN PATENTS

| 534,113 | 2/1941 | Great Britain. |

OTHER REFERENCES

The Merck Index of Chemicals and Drugs, 7th edition, 1960, page 185, 2nd paragraph.

WINSTON A. DOUGLAS, *Primary Examiner.*

JOHN H. MACK, *Examiner.*

W. VANSISE, A. SKAPARS, *Assistant Examiners.*